United States Patent [19]

Buxbaum

US005164007A

[11] Patent Number: 5,164,007

[45] Date of Patent: Nov. 17, 1992

[54] BLACK PIGMENT, PROCESS FOR ITS PREPARATION AND ITS USE

[75] Inventor: Gunter Buxbaum, Krefeld, Fed. Rep. of Germany

[73] Assignee: Bayer AG, Leverkusen, Fed. Rep. of Germany

[21] Appl. No.: 444,966

[22] Filed: Dec. 4, 1989

[30] Foreign Application Priority Data

Dec. 8, 1988 [DE]  Fed. Rep. of Germany ....... 3841313

[51] Int. Cl.$^5$ ............................................... C04B 7/02
[52] U.S. Cl. .................................... 106/712; 106/456; 106/459; 106/493
[58] Field of Search ................. 106/456, 459, 493, 712

[56] References Cited

U.S. PATENT DOCUMENTS

| | | | |
|---|---|---|---|
| 2,811,463 | 10/1957 | Burgyan | 106/459 |
| 3,276,894 | 10/1966 | Hund et al. | 106/459 |
| 3,615,810 | 10/1971 | Holznagel et al. | 106/459 |
| 3,655,418 | 4/1972 | Hardy et al. | 106/459 |
| 3,970,738 | 7/1976 | Matsui et al. | 252/62.56 |
| 4,090,888 | 5/1978 | Rademachers et al. | 106/459 |
| 4,145,229 | 3/1979 | Ferrero et al. | 106/459 |
| 4,289,745 | 9/1981 | Patil | 106/301 |
| 4,388,118 | 6/1983 | Eppler | 106/459 |
| 4,473,483 | 9/1984 | Imamura et al. | 252/62.54 |
| 4,680,130 | 7/1987 | Hibst | 106/301 |

FOREIGN PATENT DOCUMENTS 0176919  4/1986  European Pat. Off. .

OTHER PUBLICATIONS

6001 Chemical Abstracts, vol. 107, Sep., No. 12, p. 758, Ref. No. 107926m (1987).
Kiyama, M., "Formation of Manganese and Cobalt Ferrites by the Air Oxidation of Aqueous Suspensions and Their Properties", Bull. Chem. Socy. of Japan, vol. 51(1), pp. 134–138, Tokyo, Japan (1978).

*Primary Examiner*—William R. Dixon, Jr.
*Assistant Examiner*—Willie J. Thompson
*Attorney, Agent, or Firm*—Connolly and Hutz

[57] ABSTRACT

Building materials such as concrete can be colored by a black pigment which consists essentially of manganese ferrite of the composition $Mn_{1+x}Fe_{2-x}O_4$ with a spinel structure wherein x has a numerical value from −0.1 to 0.1 and the pigment is prepared by a process wherein a) soluble manganese (II) salts and soluble iron (II) salts are precipitated from a solution of metal salts by reaction with alkaline precipitating agents in an approximately stoichiometric ratio,
b) the precipitate from a) is reacted with an oxidizing agent to form a pigment, and
c) the pigment is filtered, washed, dried and ground.

9 Claims, No Drawings

BLACK PIGMENT, PROCESS FOR ITS PREPARATION AND ITS USE

The present invention relates to a black pigment which essentially consists of manganese ferrite of the general composition $Mn_{1+x}Fe_{2-x}O_4$ with a spinel structure and has x values of $-0.1$ to $0.1$, processes for the preparation of this pigment and its use.

BACKGROUND OF THE INVENTION

Building materials hardened by autoclave treatment are increasingly being used in the building materials industry. Sandlime bricks and fiber reinforced concretes are two examples of these. After shaping, these materials are hardened under pressure, usually up to 20 bar, at temperatures up to 250° C. The autoclave conditions frequently used are 205° C., 16 bar, 4 hours.

Sandlime bricks colored with $Fe_3O_4$ black will discolor and become red under these conditions. Manganese-containing iron oxides have also been employed as heat-stable pigments for some time. These are mixed phases with a bixbyite ($Mn_2O_3$) or corundum structure prepared by annealing at high temperatures.

Because of the calcination process needed for the preparation of these pigments, they are weak in tinctorial strength and difficult to disperse in comparison with precipitated black $Fe_3O_4$ pigments. Although Mn-containing mixed phase pigments, such as e.g. Bayferrox 303T ® (commercial product from Bayer AG) retain their color shade, they are weak in tinctorial strength. Thus, in contrast to an $Fe_3O_4$ pigment of high tinctorial strength, e.g. Bayferrox 330 ®, a tinctorial strength of only 35% is reached. This means that about three times the amount of Bayferrox 330T ® pigment has to be employed in order to achieve the same depth of color as with Bayferrox 330 ®.

The object of this invention is thus to provide a black pigment which does not have the disadvantages described.

BRIEF DESCRIPTION OF THE INVENTION

It has now been discovered that black pigments which do not suffer the disadvantages of known pigments are black pigments which consist essentially of manganese ferrite of the composition $Mn_{1+x}Fe_{2-x}O_4$ with a spinel structure wherein x has a numerical value from $-0.1$ to $0.1$. Such pigments are prepared by a process wherein:
a) soluble manganese(II) salts and soluble iron(II) salts are precipitated from a solution of metal salts by reaction with alkaline precipitating agents in an approximately stoichiometric ratio,
b) the precipitate from a) is reacted with an oxidizing agent to form a pigment, and
c) the pigment is filtered, washed, dried and ground.

DETAILED DESCRIPTION OF THE INVENTION

It has now been found, surprisingly, that the requirements to avoid known detriments are met by a black pigment which consists essentially of manganese ferrite of the general composition $Mn_{1+x}Fe_{2-x}O_4$ with a spinel structure and has x values of $-0.1$ to $0.1$. This invention relates to such a pigment. It is a deep black heat-stable pigment which crystallizes in the spinel structure. This is contrary to the disclosure of DP-C 1767868, which indicates that in Mn-containing mixed oxides the spinel structure is detrimental to the color shade and tinctorial strength.

Pigments in the sense of this invention have particle diameters of $0.1-1$ μm.

This pigment according to the invention has a good stability towards water vapour and air under increased pressure and increased temperature.

As noted above, the pigments of this invention overcome a prior art prejudiced belief that the spinel structure in Mn-containing mixed oxides is detrimental to color shade and tinctorial strength. However, that prior art prejudice evidently applies only to pigments prepared by annealing. The manganese ferrite pigments according to the invention prepared by the precipitation process described below are of good tinctorial strength, deep black, stable and very readily dispersible. Accordingly, this invention also relates to a process for the preparation of these pigments. These pigments can be obtained by a procedure in which iron(II) salts and manganese(II) salts are reacted in aqueous solution with alkaline substances in an approximately stoichiometric ratio and the products are then oxidized at elevated temperature.

The process according to the invention is thus preferably carried out by a procedure in which
a) soluble manganese(II) salts and soluble iron(II) salts are reacted with alkaline precipitating agents in an approximately stoichiometric ratio,
b) the precipitate is reacted with an oxidizing agent, preferably air, and
c) the pigment is filtered off, washed, dried and ground.

The reaction temperatures can be between 50° C. and the water boiling point, the range between 80° and 95° C. being advantageous from economic considerations, because the rate of reaction is high enough and the heat discharge by steam is acceptable.

A preferred embodiment of the process according to the invention thus comprises a procedure in which the oxidation is carried out at temperatures between 50° C. and the water boiling point, preferably between 80° and 95° C., using air.

The precipitation conditions are not critical. The precipitation can be carried out either at room temperature or at the reaction temperature. However, it is advantageous to heat up the $FeSO_4/MnSO_4$ solution to somewhat below the envisaged reaction temperature in order to utilize the heat of neutralization formed during addition of the alkali for increasing the temperature further.

The alkali metal hydroxides usually employed, preferably NaOH or KOH, the alkali metal carbonates, in particular $Na_2CO_3$, and also alkaline earth metal hydroxides, such as $Mg(OH)_2$ or $Ca(OH)_2$, or MgO or CaO or mixtures of the compounds mentioned can be used for the precipitation.

Powerful oxidizing agents, such as nitrates or chlorates, can be used for the oxidation. However, the use of air or oxygen is preferred.

A preferred embodiment of the process according to the invention comprises a procedure in which the precipitation with the alkaline precipitating agent and if appropriate the heating up to the oxidation temperature are carried out under non-oxidizing conditions.

In a preferred embodiment, residues of more highly charged Fe and/or Mn ions which may be present as impurities are eliminated by reduction, preferably over scrap iron.

The content of Fe(III) and Mn(III) in the metal salt solution is thus preferably lowered by reduction, preferably over iron metal.

Salts of iron and manganese which can be used are the salts of the strong mineral acids, preferably the chlorides or sulphates, and particularly preferably the sulphates, for reasons of low corrosiveness. The green salt obtained as a waste substance in the production of titanium dioxide and the manganese sulphate obtained during oxidations in the field of organic chemistry, e.g. in hydroquinone synthesis, can be used in particular here. Contamination by other spinel-forming cations in the range up to about 5% does no harm here.

A particularly economic embodiment of the process according to the invention thus comprises a procedure in which, preferably, iron sulphate from the preparation of $TiO_2$ or from pickling plants and manganese sulphate from waste salt solutions of organic reactions are used as the sources of metal salts.

Since relatively high contents of Fe(III) in the solution lead to fine-particled products, premature oxidation of the solution before the precipitation is to be avoided in order to produce a coarse blue-black pigment, and this is best achieved by nitrogen shielding.

The resulting pigments are filtered off, washed and dried at elevated temperature in the customary manner.

After the grinding customary in pigment preparation, e.g. in disintegrators, disc-vibratory mills or jet mills, tests are performed in the binder F 48 in accordance with DIN 6174/ISO 7724, 1-3 drafts to determine the tinctorial strength and the color tinge and the CIELAB (C/2-deg) values are reported in the examples.

The BET specific surface area ($S_{BET}$) in the embodiment of the nitrogen method according to DIN 66131 is used for further characterization of the pigments.

This invention also relates to the use of the black pigment according to the invention for coloring building materials.

Testing in autoclaved building materials is carried out in recipes described in detail in H. Gundlach, "Dampfgehärtete Baustoffe (Steam-hardened Building Materials)", Wiesbaden-Berlin, 1973, p. 229 et seq. The hardening conditions for fiberreinforced concrete sheets are either 180° C., 8 bar, 8 hours or 204° C., 16 bar, 4 hours. The sheets are evaluated visually.

The invention is to be explained in more detail below with the aid of examples, but without limiting it.

EXAMPLE 1

12.2 l $FeSO_4$ solution containing 100 g $FeSO_4$/l and 676 g $MnSO_4 \times H_2O$, dissolved in 6 l water, were combined in a 30 l stirred tank provided with a gassing stirrer, gassed with nitrogen and heated up to 85° C. 1,569 ml sodium hydroxide solution containing 1,017 g NaOH were then added in the course of 11 min, and the mixture was gassed with 100 l/h air and 100 l/h $N_2$ for 1 h and with 400 l/h air and 100 l/h $N_2$ for a further 4 h, the temperature of 85° C. being kept constant. The black suspension of $MnFe_2O_4$ was washed on suction filters and dried at 60° C. in a circulating air cabinet. The spec. surface area was determined as 7.1 m²/g.

EXAMPLE 2

The dried $MnFe_2O_4$ pigment was subjected to various grinding operations in a bead vibratory mill, Dismembrator ® model:
a) 1 min with agate beads
b) 20 sec with steel beads
c) 1 min with steel beads
d) 3 min with steel beads The tinctorial strengths were then determined as described above in Alkyldal lacquer F 48 in comparison with Bayferrox 303 T=100%.

|   | Tinctorial strength | CIELAB units | | |
|---|---|---|---|---|
|   |   | $\Delta a^*$ | $\Delta b^*$ | $\Delta c^*$ |
| a | 252% | 0.0 | 1.1 | −1.1 |
| b | 272% | 0.0 | 1.2 | −1.2 |
| c | 303% | 0.2 | 1.4 | −1.4 |
| d | 318% | 0.3 | 1.6 | −1.6 |

A distinct increase in tinctorial strength with the grinding intensity and a slight, still tolerable yellow shift of the color shade can be seen.

EXAMPLE 3

The batch as in example 1 was heated up to only 83° C. and precipitated with the sodium hydroxide solution. During this procedure, the temperature rose to 86° C. This temperature was kept constant. The reaction had ended after 3.5 h, and after working up described, the following color values were determined (grinding: 1 min, agate beads)

| Tinctorial strength | $\Delta a^*$ | $\Delta b^*$ |
|---|---|---|
| 218% | −0.2 | −0.7 |

The product from example 3 has a somewhat weaker tinctorial strength than that from example 2, but is more bluish-tinged.

EXAMPLE 4

As in example 1, 1,220 g $FeSO_4$ in 12.2 l and 709.8 g $MnSO_4 \times H_2O$ were precipitated with 1,032 g NaOH in 1.59 liquor at 85° C. and the mixture was gassed with 400 l/h air and 100 l/h $N_2$. The reaction has ended after 5 h.

The following color values were determined after customary working up:

| Tinctorial strength | $\Delta a^*$ | $\Delta b^*$ |
|---|---|---|
| 175% | −0.3 | 1.2 |

The composition of the ferrite approximately corresponds to the formula $Mn_{1.04}Fe_{1.96}O_4$. The X-ray diffraction diagram shows the pure spinel phase.

EXAMPLE 5

12.2 l solution containing 1.22 kg $FeSO_4$ were heated up to 80° C. under $N_2$ and the precipitate prepared at 25° C. from 676 g $MnSO_4 \times H_2O$ in 6 l water and 1,016 g NaOH in 1.59 l solution was added under $N_2$. After heating up further to 90° C., the mixture was gassed with 400 l/h air and 100 l/h $N_2$ for 4 h. After filtering, washing and drying at 105° C., the following color values were determined:

| Tinctorial strength | $\Delta a^*$ | $\Delta b^*$ |
|---|---|---|
| 270% | 0.1 | 0.7 |

The spec. surface area was determined as 6.7 m²/g.

EXAMPLE 6

In accordance with example 1, the $FeSO_4/MnSO_4$ solution was precipitated at 75° C. with 1,117 g NaOH in 1.69 l liquor (i.e. 10% excess) and the mixture was heated up to 80° C. The mixture was then gassed with 400 l air/h and 100 l $N_2$ and heated up further to 90° C. in the course of 13 min, and the reaction conditions were maintained for a further 2.5 h. After working up and drying at 105° C., the following values were determined:

| Tinctorial strength | $\Delta a^*$ | $\Delta b^*$ |
| --- | --- | --- |
| 352% | 1.0 | 3.0 |

EXAMPLE 7

1,220 g $FeSO_4$ solution and 676 g $MnSO_4 \times H_2O$ were employed as in example 1, but the $MnSO_4$ solution was stirred with 5 g ferrum reductum under $N_2$ shielding for 5 min. Thereafter, a content of Mn ions of higher valency was no longer to be determined by titrimetry. The precipitation was carried out at 70° C. The mixture was then heated up to 90° C. and gassed with 400 l air/h and 100 l $N_2$/h for 3.5 h. The spec. surface areas were determined as 4.8 $m^2/g$. One part (A) was dried at 125° C. and (B) was dried at 40° C.

The following values were measured:

|  | Tinctorial strength | $\Delta a^*$ | $\Delta b^*$ |
| --- | --- | --- | --- |
| 7A | 176% | −0.4 | 0.5 |
| 7B | 199% | −0.4 | 0.3 |

Gentle drying leads to a somewhat bluish-tinged pigment of good tinctorial strength.

EXAMPLE 8

The samples from examples 1 and 3–7 were ground in a disc vibratory mill with steel rings for 20 min and processed to fiber reinforced concrete sheets. After autoclaving at 204° C., 16 bar, 4 hours, all the samples retained the black color shade, whereas the fiber reinforced concrete sheet also prepared for comparison and pigmented with $Fe_3O_4$ was discolored to a red-brown.

What is claimed is:

1. A heat-stable, dispersible black pigment which consists essentially of manganese ferrite of the composition $Mn_{1+x}Fe_{2-x}O_4$ with a spinel structure wherein x has a numerical value from −0.1 to 0.1.

2. A process for the preparation of a black pigment which consists essentially of manganese ferrite of the composition $Mn_{1+x}Fe_{2-x}O_4$ wherein x has a value of −0.1 to 0.1 according to claim 1, wherein
   (a) soluble manganese (II) salts and soluble iron (II) salts are precipitated from a solution of metal salts that also contains manganese (III) salts and iron (III) salts by reaction with alkaline precipitating agents in an approximately stoichiometric ratio,
   (b) the precipitate from (a) is reacted with an oxidizing agent to form a pigment, and
   (c) the pigment is filtered, washed, dried and ground.

3. Process according to claim 2 wherein oxidation is at temperatures between 50° C. and the boiling point of water and air is the oxidizing agent.

4. Process according to claim 3 wherein the temperature is from 80° to 95° C.

5. Process according to claim 2 wherein the reaction with the alkaline precipitating agent is carried out under nonoxidizing conditions.

6. Process according to claim 2 wherein the content of Fe(III) and Mn(III) in the metal salt solution is lowered by reduction prior to reaction with precipitating agents in a).

7. Process according to claim 2 wherein iron sulphate from the preparation of $TiO_2$ or from pickling plants and manganese sulphate from waste salt solutions of organic reactions are the sources of metal salts.

8. A colored building material containing a coloring amount of the black pigment as claimed in claim 1.

9. A colored concrete containing a coloring amount of the black pigment as claimed in claim 1.

* * * * *